Figure 1:
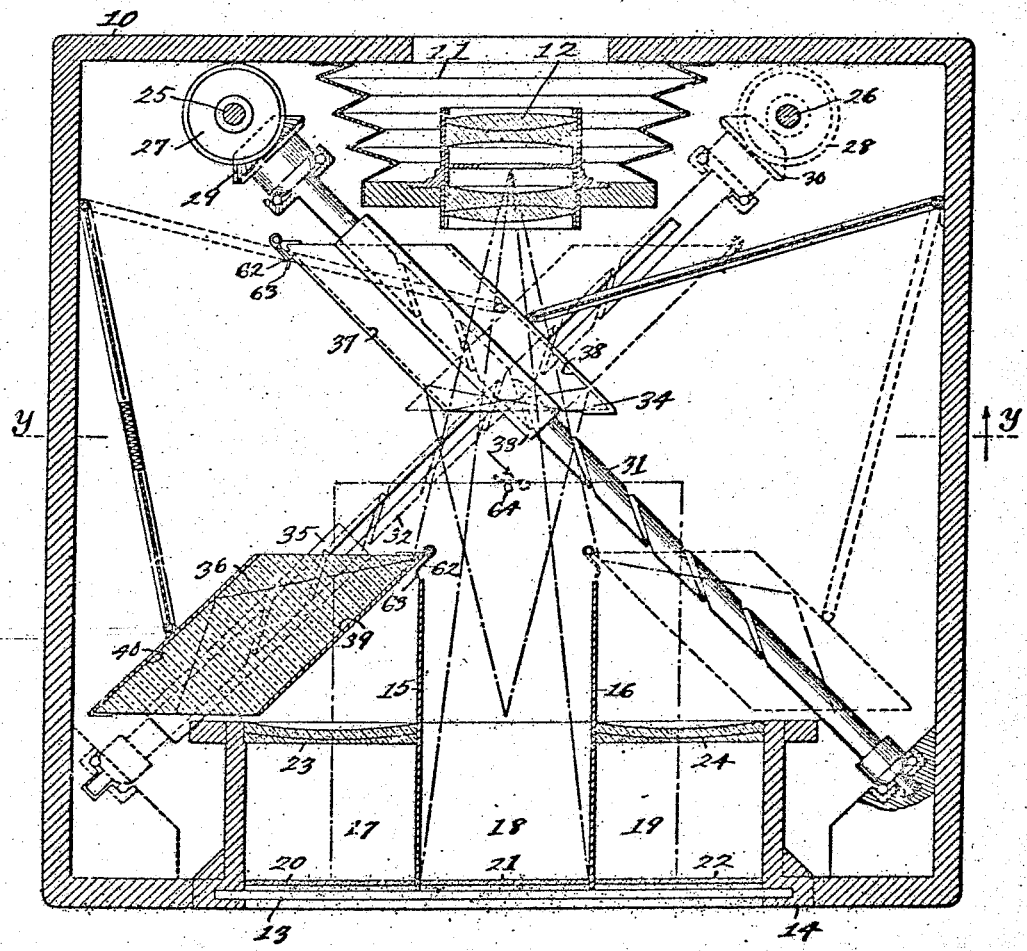

W. H. DOHERTY.
COLOR PHOTOGRAPHING APPARATUS.
APPLICATION FILED JUNE 17, 1914.

1,207,513.  Patented Dec. 5, 1916.
3 SHEETS—SHEET 1.

WITNESSES  INVENTOR
William H. Doherty
BY Munn & Co
ATTORNEYS

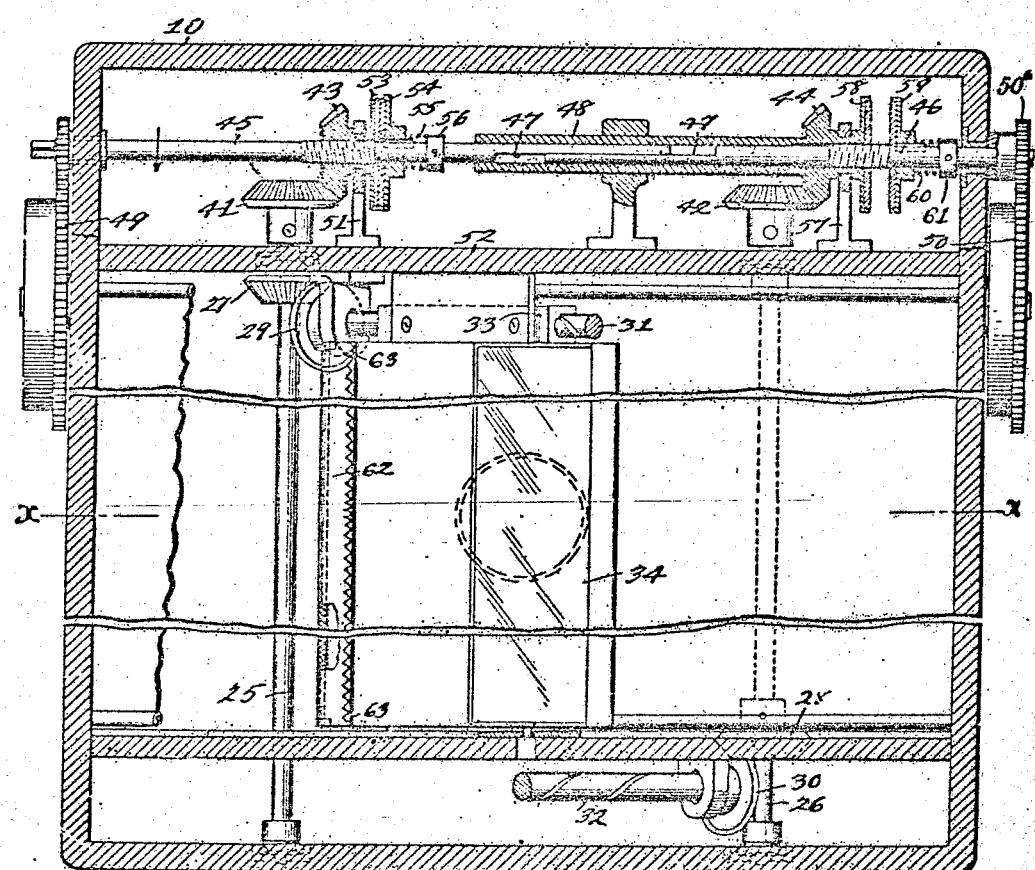

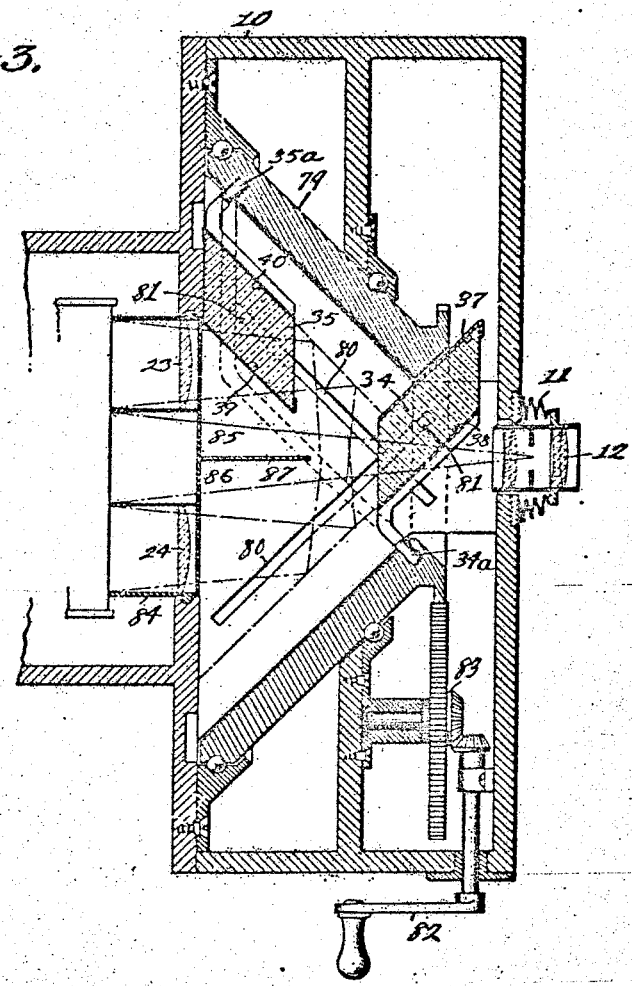

UNITED STATES PATENT OFFICE.

WILLIAM HENRY DOHERTY, OF CHARLESTOWN, MASSACHUSETTS.

COLOR-PHOTOGRAPHING APPARATUS.

1,207,513.   Specification of Letters Patent.   Patented Dec. 5, 1916.

Application filed June 17, 1914. Serial No. 845,580.

*To all whom it may concern:*

Be it known that I, WILLIAM H. DOHERTY, a citizen of the United States, and a resident of Charlestown, in the county of Suffolk and State of Massachusetts, have invented certain new and useful Improvements in Color-Photographing Apparatus, of which the following is a specification.

My present invention relates to cameras and is an improvement over that form shown and described in my application for Letters Patent, filed April 2, 1913, Serial No. 758,328, allowed March 2, 1914, in that, while being an apparatus for color photography, the present form provides for either two plates in focal plane, or three plates, of different color screen results, and, further, that in this present form I arrange the plates when two in number in one focal plane located in the conventional position or, when three in number, in another focal plane also located conventionally in the rear of the camera.

A further object is to provide prisms having two reflecting surfaces, each, instead of but one as in the forms mentioned, to admit of the reflection of the rays of light to the conventionally located focal plane, or planes.

A further object is to provide suitable prism operating means, either manual or power driven, whereby each of said prisms is carried into light reflecting position, with respect to the objective lens, for corresponding plates in the corresponding focal plane.

A further object is to provide means for making the prism operation continuous as for moving picture cameras, or merely for passing the prisms once, each, across the direct path of light rays, as for single exposure cameras.

A further object is to provide removable frames having, each, the desired number of sensitized plate holders, in focal planes, and also carrying color screens, and light obstacles.

A further object is to provide a shield, either movable or otherwise, on each prism to intercept direct rays at desired periods of prism movement, and also to prevent interiorly reflected rays from passing through the same, the shields, when movable, being operable by suitable means provided at desired positions of the prisms.

A further object is to provide one form of prism, if desired, having a liquid or other screen or filter arranged between two reflecting elements, thus dispensing with the screens in the positions of the sensitized plates; and further objects are to make such cameras which are simple in construction and use, fully efficient, well adapted to the purpose for which they are designed, and comparatively inexpensive.

My invention is fully described in the following specification, of which the accompanying drawings form a part, in which the same parts are designated by the same reference characters in each of the views, and in which:—

Figure 1 is a section through one form of camera embodying my invention, on the line X—X of Fig. 2, but showing one of the prisms which I employ in full lines for the purpose of showing the moving means therefor; Fig. 2 is a section taken on the line Y—Y of Fig. 1, with parts broken away to show prism control means; and Fig. 3 is a sectional plan view of a modification.

In Figs. 1 and 2 I have shown a casing 10, the usual bellows 11, and lens 12, and grooves 13 for a plate-holder, not shown, arranged in the focal plane of the casing, said grooves being arranged in a frame 14 adapted for removal from the casing, and said frame also carries two light obstructing partitions 15 and 16 dividing the plate-holder space into three sections 17, 18 and 19, each of which has a color screen 20, 21 and 22, respectively, adjacent the focal plane, and said frame also carries two chromatic corrected lenses 23 and 24, and it will be noted that the partitions 15 and 16 project into the casing a material distance beyond the lenses 23 and 24 to prevent direct rays through the objective lens 12 from reaching the lenses 23 and 24.

I provide two vertical shafts 25 and 26 adjacent the bellows 11, one on either side thereof, the former of which has a bevel gear 27 at a slight distance below its upper end and the latter of which has a similar gear 28 at its lower end, said gears being enmeshed with gears 29 and 30 on reverse worm shafts 31 and 32, respectively, the former of which is engaged with a sleeve 33 carrying a prism 34 and the latter of which is engaged with a sleeve 35 carrying a prism 36, said prisms, in the forms shown, being rhomboidal in cross section and having two metallic or other reflecting surfaces each, 37 and 38 and 39 and 40, in parallel arrangement in each rhomboid, but oppositely directed in the two rhomboids.

The shafts 25 and 26 are provided with bevel gears 41 and 42, respectively, enmeshed with corresponding gears 43 and 44 on shafts 45 and 46, respectively, Fig. 2, the last named gears being in screw-threaded engagement with their respective shafts, and said shafts are each flattened at their inner ends, as shown at 47, whereby a sliding joint is produced within a support 48; this joint insures the complemental rotation of the shafts and also permits longitudinal movement of said shafts with respect to each other; the shafts 45 and 46 are provided with driving means 49 and 50, respectively, spring motor as shown, but which may be manual, through the medium of pinions 49ª and 50ª in which the respective shafts are slidable but not rotatable.

The gear 43 is revoluble in a support 51 held on a flooring 52 and carries a friction disk 53 adapted to be engaged by a similar disk 54 slidably keyed on the shaft 45 and held in such engagement, in the position of the said shaft as shown, by a coil-spring 55 backed by a collar 56 secured to said shaft, and it will be seen that, if the shaft 45 be rotated in the direction of the arrow, the screw-thread thereon moves said shaft longitudinally toward the shaft 46, thus releasing the tension between the friction disks 53 and 54 and no motion is transmitted by the shaft 45 to the gear 43 but, if the friction disks bear upon each other, as shown, the gear 43 is revolved, as is also the gear 41, rotating the shaft 25 and revolving the gears 27 and 29 to rotate the worm 31 and thus move the prism 34 rearwardly and diagonally of the casing 10.

The gear 44 is revoluble in a support 57 on the flooring 52 and carries a friction disk 58 against which a friction disk 59 is adapted to bear, said latter disk being keyed on the said shaft 46 and normally forced in the direction of the disk 58 by means of a coil-spring 60 backed by a collar 61 on said shaft, and rotation of the shaft 46 in the last described direction of the shaft 45 moves the shaft 46 inwardly of the casing and carries the disk 59 toward the disk 58, to lock said disks together.

From the position of the parts shown in Figs. 1 and 2, if the shaft 45 be rotated in the direction of the arrow, the gears 43, 41, 27 and 29 are revolved because of the friction disk engagement of this shaft, and the prism 34 is thus carried inwardly and rearwardly, through the direct rays of light from the lens 12 and, when said prism is in such position that the upper end thereof is in the direct range of said rays, the rays of light are reflected from one reflecting surface to the other and thence to the exposure section 19, through the correcting lens 24 and the color screen 22, and the sensitized plate at such point is exposed, the outer surface of the interiorly reflecting metallic or other elements being opaque and serve as light obstacles in the initial position shown of each.

When the prism 34 has reached its inward limit of movement, the gear 43 can no longer revolve in this direction, and the screw-thread on the shaft 45 moves said shaft inwardly, thus reducing and eventually preventing the action of the coil spring on the friction disk 54 and the rotation of said shaft similarly rotates the shaft 46, the movement of which, because of the screw-thread thereon, being also inwardly of the casing, until the friction disk 59 engages the friction disk 58 to revolve the gear 44, thus revolving the gears 42, 28 and 30, and rotating the worm shaft 32 to carry the prism 36 forwardly and diagonally to cross the direct path of the rays of light from the lens 12, said rays being reflected to the sensitized plate in the section 17, through the correcting lens 23 and color screen 20, and this plate is exposed.

When one prism has passed to its limit of movement and just before the other begins its movement, the direct rays from the lens 12 pass through the color screen 21 to the plate 18 which is then exposed, the interval existing between the obstructing of the light by the non-reflecting exteriors of the prisms is calculated, and is gaged, to a degree, by the speed of rotation of the driving shaft, but this is a constructive detail and subject to modification.

As clearly shown in Figs. 1 and 2, I provide an opaque screen 62 on each of the prisms 34 and 36, and hinged thereto, the outer ends, 63, of which are adapted to engage with a fixed pin 64 in the casing 10 to swing the corresponding screens on their hinges to shut off the direct rays from the central portion of the sensitized plate in the compartment 18, to permit a longer exposure for the corresponding edges thereof, and these screens may be made of any desired size, shape or material.

It will thus be seen that, in one direction of driving shaft movement, one prism is carried across the path of direct rays of light and then the other, each reflecting the rays of light to a corresponding sensitized plate, and an interval occurring in which a third plate is exposed, said plates being normally protected from the light, and, when such exposure has been made, new plates may be substituted for those exposed and the direction of shaft movement reversed to expose the same, in the return of the prisms to their initial positions.

In Fig. 3 is shown a further modification of the prism operating means, comprising a revoluble cone 79 within which are the top and bottom guide plates, only one of which is shown and which is slotted at 80 for the pins 81 of the prisms; a crank-handle 82 is connected with said cone by means of a train of gears 83, and I also provide an endless slot in the cone, only one-half of which slot is indicated by dotted lines; said slot comprises two portions, adjacent each planetary side of the cone, arranged parallel to said sides, and said portions are joined by two inclined portions, each prism having a pin 34ª and 35ᵉ sliding in said cone slot, and it will be seen that the prisms are held motionless, one at each surface of the cone, when the pins thereof are in the parallel portions of the slot but move inwardly or outwardly when the inclined portions of said slot engage the pins, but I do not confine myself to any specific details in connection with this form.

In Fig. 3 is also illustrated a feature which I may use in any of the forms, and relates to the focal plane or planes of the camera; I provide a removable frame 84 as a substitute for the frame 14 already described, and comprises but two sections 85 and 86 separated by a partition 87 arranged on the axis of the objective lens 12, thereby providing two places for two plate-holders having sensitized plates therein and adapted to be alternately exposed by the light reflected through the corresponding prisms, this frame being employed with wide-angle lenses, preferably, and permitting two pictures equaling the dimensions of the three exposed in the frame 14, the partition 87 blocking the passage of light through either prism to the plate not to be exposed therethrough.

It will thus be seen that I may direct rays of light to any of three focal planes, by means of double reflecting prisms movable, each, into the path of the direct rays of light through the objective lens, and oppositely arranged to direct the reflected rays alternately to sides opposite the focal plane of the direct rays, thus making three exposures through corresponding color screens, and which screens may be located adjacent the sensitized plates, or may be carried by the respective prisms, as a part thereof.

I claim—

1. A camera, comprising a casing, a lens, a plurality of light reflecting elements, and means for sliding said elements obliquely across the axis of said lens to direct light rays to different portions of a plane perpendicular to the axis of said lens.

2. A camera, comprising a casing, a lens, a plurality of light reflecting elements, and means for sliding said elements obliquely at different periods across the axis of said lens to direct light rays to different portions of a plane perpendicular to the axis of said lens.

3. A camera, comprising a casing, a lens, a plurality of light reflecting elements, and means for sliding said elements obliquely at different periods across the axis of said lens with an interval therebetween to direct light rays to different portions of a plane and to expose another portion of said plane to direct light rays from said lens.

In testimony whereof I have signed my name to this specification in the presence of the subscribing witnesses.

WILLIAM HENRY DOHERTY.

Witnesses:
   Geo. C. Doherty, Sr.,
   William P. Sullivan.